United States Patent [19]
Metzner

[11] 3,734,433
[45] May 22, 1973

[54] AUTOMATICALLY CONTROLLED TRANSPORTATION SYSTEM

[76] Inventor: Robert G. Metzner, 916 North Fonthill Road, Beverly Hills, Calif. 90210

[22] Filed: Apr. 10, 1970

[21] Appl. No.: 27,354

Related U.S. Application Data

[63] Continuation-in-part of Ser. No. 676,594, Oct. 19, 1967, Pat. No. 3,537,401.

[52] U.S. Cl. ................246/1 R, 104/88, 246/187 B
[51] Int. Cl. ...........................................B61l 23/00
[58] Field of Search.......................246/182 R, 182 B, 246/182 C, 187 B, 66, 1 R; 198/34; 104/88

[56] References Cited
UNITED STATES PATENTS

| | | | |
|---|---|---|---|
| 2,803,743 | 8/1957 | Ballerait | 246/182 R |
| 3,263,625 | 8/1966 | Midis et al. | 104/148 R X |
| 3,411,456 | 11/1968 | Stevens | 104/172 S X |
| 3,458,026 | 7/1969 | Lauzon et al. | 198/34 |
| 3,318,260 | 5/1967 | Gillespie | 104/88 |

Primary Examiner—Gerald M. Forlenza
Assistant Examiner—George H. Libman
Attorney—Bernard Kriegel

[57] ABSTRACT

A transportation system is disclosed in which vehicles travelling along a track or roadway are automatically spaced in response to timing and speed controlling systems so as to assure proper spacing of intersecting vehicles. Vehicles energize timing elements which apply signals to the vehicles to accelerate or decelerate them to achieve predetermined, desired speeds.

8 Claims, 12 Drawing Figures

Patented May 22, 1973

INVENTOR
ROBERT G. METZNER
By Bernard Krieger
ATTORNEY

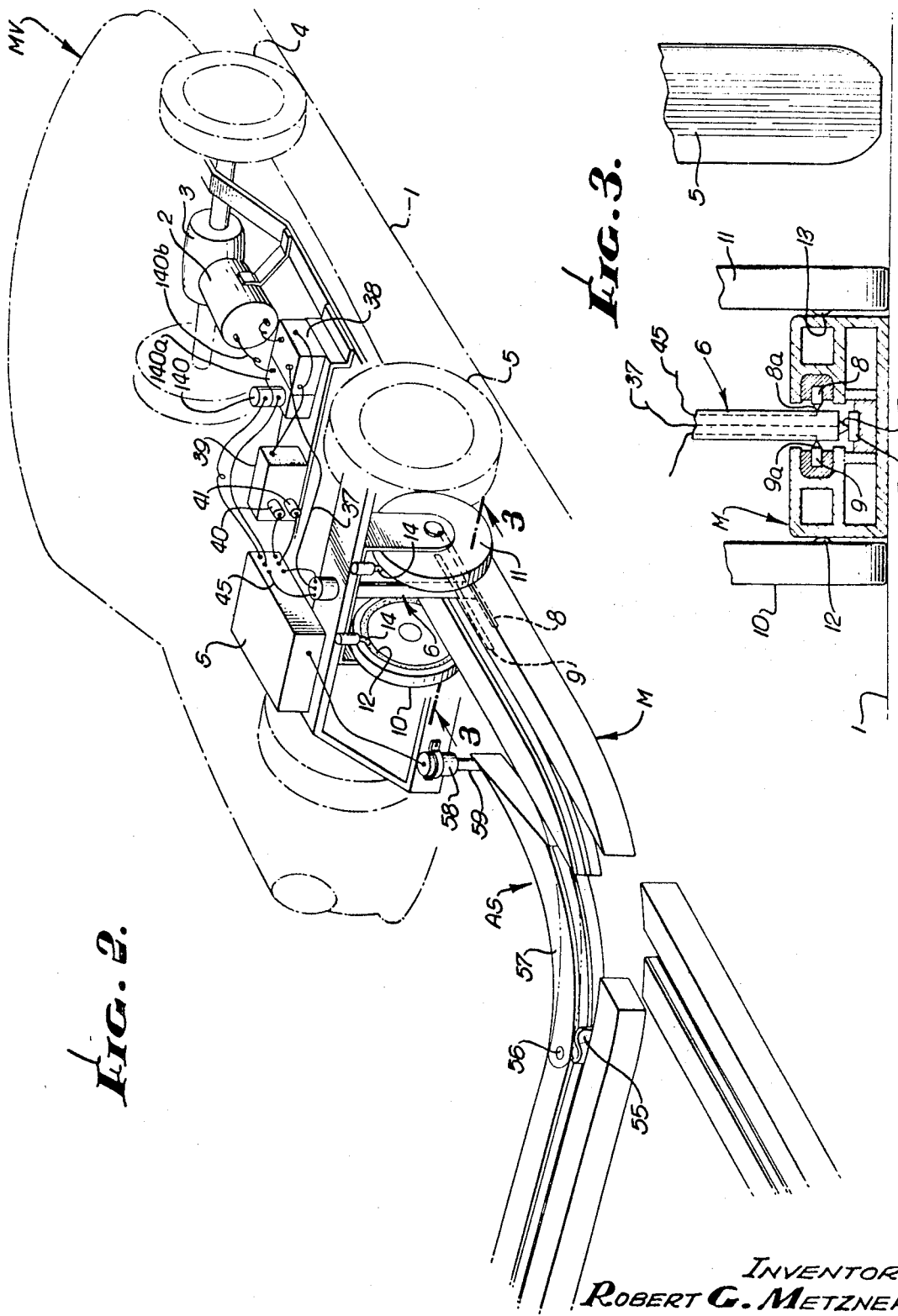

Patented May 22, 1973
3,734,433
6 Sheets-Sheet 4
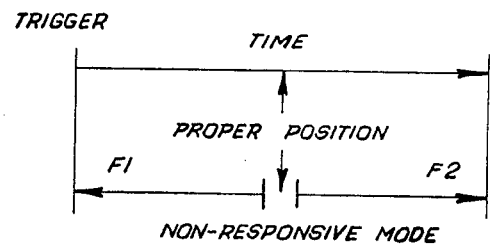
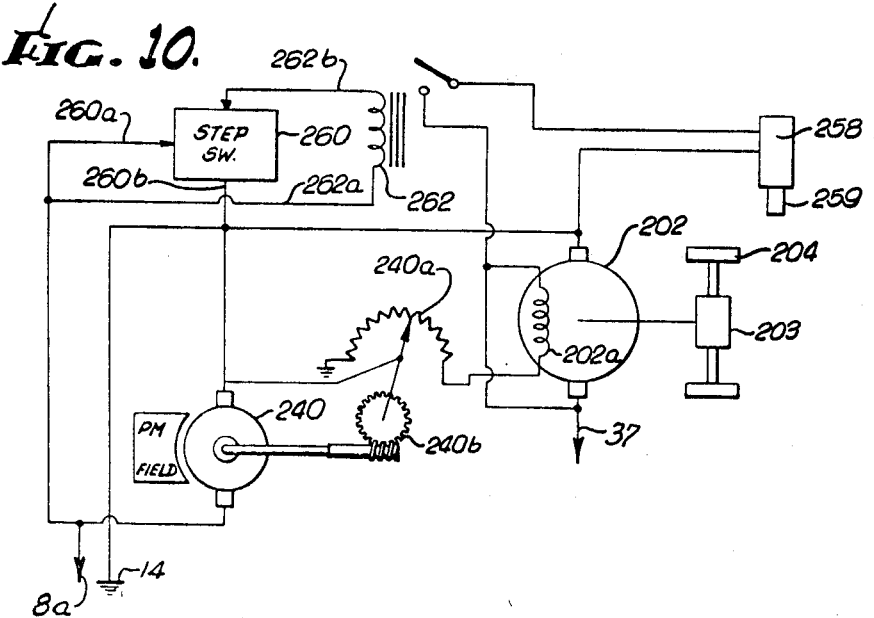
INVENTOR
ROBERT G. METZNER
BY Bernard Kriegel
ATTORNEY

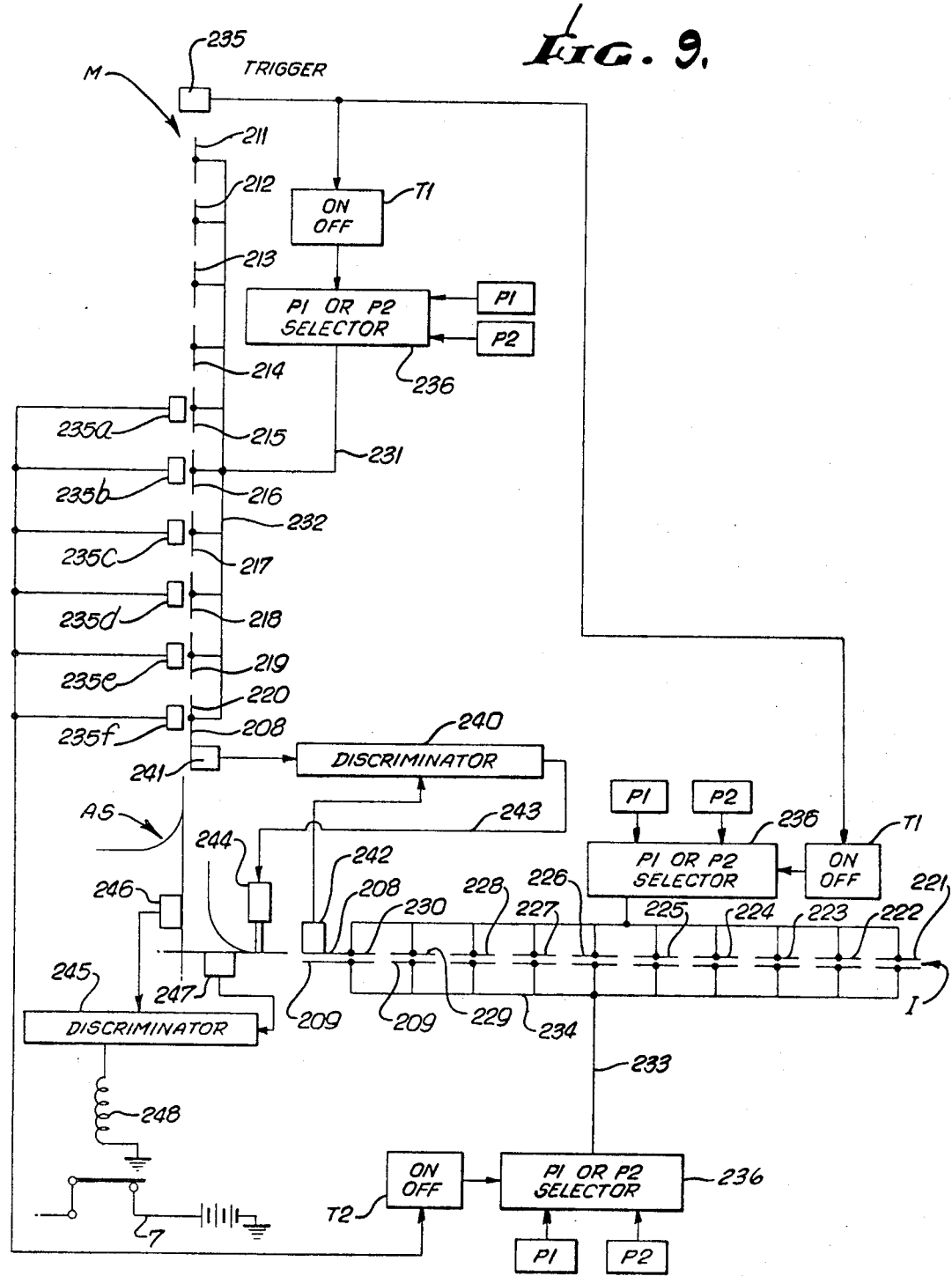

INVENTOR.
ROBERT G. METZNER
BY
Bernard Kriegel
ATTORNEY.

AUTOMATICALLY CONTROLLED TRANSPORTATION SYSTEM

The present application is a continuation-in-part of application Ser. No. 676,594, filed Oct. 19, 1967, for "Automatically Controlled Transportation System," now U.S. Pat. No. 3,537,401.

The present invention relates to a transportation system, and more particularly to a system in which vehicles moving along a path are automatically properly spaced by adjustment of velocities.

An object of the present invention is to provide a transportation system such as might be employed for the use of transporting people or material along a predetermined track or path, and in which collisions with intersecting or merging vehicles are avoided by assuring proper spacing of main line and intersecting vehicles as they approach an intersection. In accordance with this objective, delays are avoided in the merging or intersecting traffic, since it is unnecessary for vehicles on one track or path to await the presence of a random space between vehicles on the other track or path, and, in addition, in accordance with this objective, the necessity for overpasses or underpasses for cross traffic is avoided.

Another object of the invention is to provide a transportation system in which the spacing of the vehicles is automatically controlled on the main line of vehicles by cooperative time and speed control systems, so that each vehicle in the main line of traffic is properly positioned as it approaches an intersecting line, and the intersecting vehicles are also properly spaced by time and speed control systems so that the respective lines of vehicles are offset from one another in uniform spaced relation at the intersection.

An additional object of the invention is to provide a transportation system in which objects travelling in a path at predetermined constant speeds can be decelerated to a desired lower speed for purposes of transfer to a different path. Similarly, objects can be accelerated from lower speeds to the predetermined speed for purposes of merging with objects travelling in a path at the predetermined speed.

It is a further object of the invention to provide a transportation system in which the spacing, as between objects, is intermittently adjusted to achieve a predetermined uniform spacing, based upon the velocities of the objects.

In addition, objectives of the invention include the provision of a timing system for imposing speed corrective pulses or signals on a speed control system of a vehicle and a speed control system responsive to timed pulses from a timing system.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 2 is a view in perspective generally illustrating one of the vehicles and its control system, as well as a motive system and a safety abort or sidetrack;

FIG. 3 is a fragmentary view partially in transverse section as taken on the line 3—3 of FIG. 2, and illustrating the motive power and control pickup means of the vehicles of FIGS. 1 and 2;

FIG. 6 is a graphic illustration of the function of the timing and speed control means of FIGS. 4 and 5;

FIG. 9 is a view diagrammatically illustrating the application of a redundant vehicle control system to main and intersecting tracks in accordance with the invention;

FIG. 10 is a view diagrammatically illustrating another embodiment of speed control system;

Figure 1:
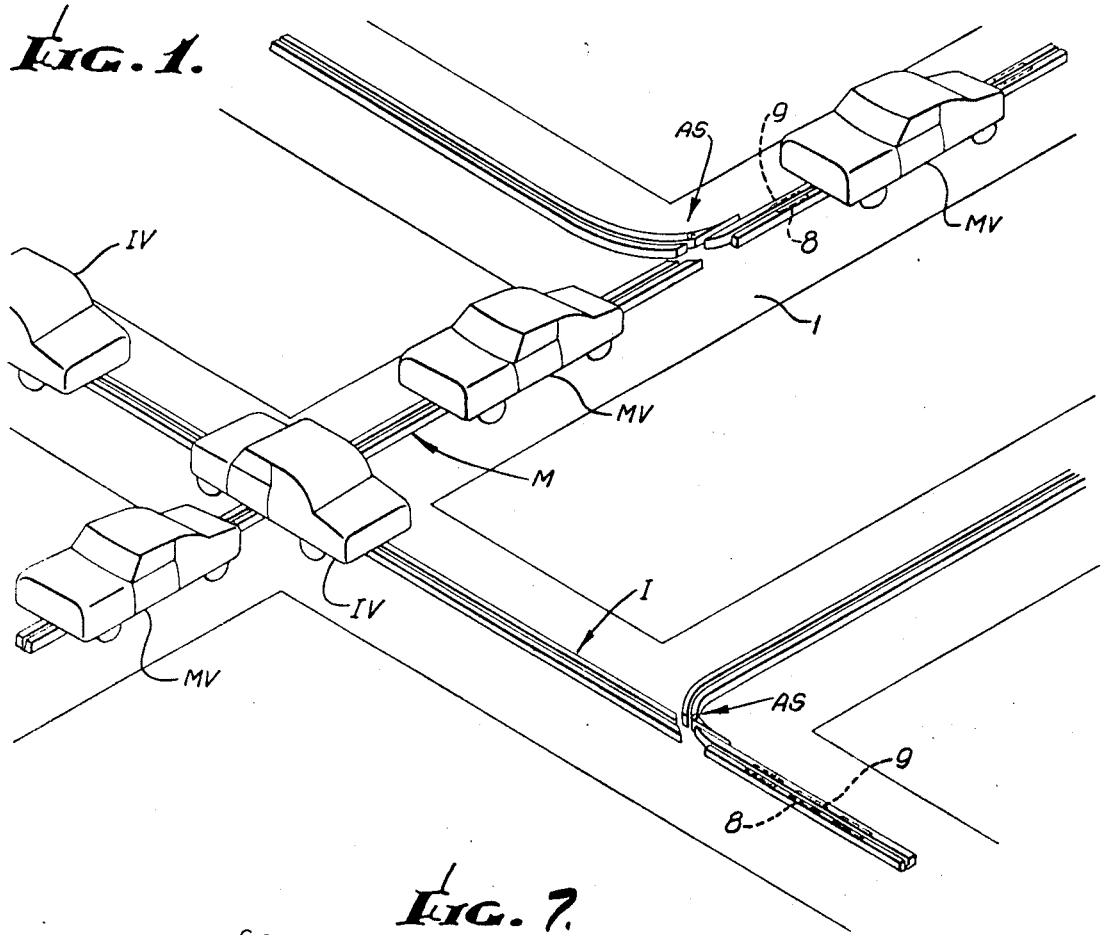
FIG. 1 is a view in perspective illustrating a transportation system embodying the invention, and including a main line of vehicles and an intersecting line of vehicles.

Referring first to FIG. 1, there are generally illustrated a main track M and an intersecting track I which, respectively, constitute means for establishing the guidance for main vehicles MV and intersecting vehicles IV. It will be understood that the vehicles, while being illustrated as wheeled vehicles adapted to be moved along a supporting surface or roadway 1 separate from the tracks M and I, may be adapted as well to be conducted on the usual rails. The main and intersecting tracks M and I, respectively, may be adapted to support main power conductors in the case of electrically powered vehicles, or, on the other hand, the vehicles may be otherwise powered as by self-contained battery packs, in which case the main track M and the intersecting track I would contain, as will hereinafter more fully appear, only control conductors which will establish the mode of operation of the vehicles. Moreover, while the vehicles have been generally illustrated as passenger type vehicles, it will be understood that they may be of any desired types for transporting material or passengers, as may be desired. In any event, it is the purpose of the present invention to provide control means whereby the main vehicles MV and the intersecting vehicles IV may be regulated in their relationship to one another so that, as shown in FIG. 1, the intersecting vehicles IV will cross the main track M between adjacent main vehicles MV. It will also be understood that while an intersection of the crossing type has been illustrated, the intersection may be of a merging type, in which the intersecting vehicles IV would ultimately assume positions intermediate the main vehicles MV travelling along the main track M.

Included in the main track M is an abort switch, generally designated AS, and a similar abort switch AS is also included in the intersecting track I, so that, in a manner hereinafter to be more fully described, the vehicles MV or IV, as the case may be, may be sidetracked when there is impending danger of collision at the intersection, due to the improper spacing of one or another of the vehicles as they approach the intersection.

A typical abort switch AS is illustrated in FIG. 2, as is an illustrative vehicle designated MV and illustrative also of the vehicles IV, which includes the components of a control system whereby the electromotive force supplied to a prime mover or motor means 2 of the vehicle is so regulated as to assure that the vehicle will be in the desired position relative to the switch AS at a given point in time so as to avoid collision of the vehicle MV with an intersecting vehicle.

Illustratively, the vehicle MV includes a differential 3 driven by the motor 2 and adapted to drive rear vehicle wheels 4 which are in engagement with the vehicle supporting surface 1, previously referred to. The vehicle also, in the illustrative showing, includes front wheels 5 which are out of engagement with the surface 1 when the vehicle is in operative association with the track M, or with an intersecting track I. In this connection, the vehicle may be adapted to be operated independently of the tracks M and I when disassociated therefrom, under which circumstances the wheels 5 would be employed as steering wheels.

Generally, the vehicle control system includes pickup or sensing means, generally denoted at 6, adapted to make connection, as shown in FIG. 3, with a main power or center conductor rail 7 within the track M, as well as to make contact with one or more control conductors 8 and 9 also carried within the track M at opposite sides of the main power conductor 7. The pickup means 6 includes supporting wheels 10 and 11 adapted to engage at opposite sides of the track and to also support the vehicle upon the surface 1, with the vehicle wheels 5 spaced from the surface 1, as shown in FIG. 3. These pickup wheels 10 and 11, respectively, are provided on their inner surfaces with circumferentially continuous annular contacts, respectively designated 12 and 13, which constitute ground contacts engageable with the rail M to complete the circuit from the control system hereinafter to be described, there being a ground brush 14, as seen in FIG. 2, adapted to establish contact with each of the annular ground conductors 12 and 13, the ground brush 14 being suitably connected to the electrical control system. The pickup means 6 also includes a suitable brush 8a adapted to make electrical connection with the control conductors 8, and another brush 9a adapted to make electrical contact with the control conductors 9 embodied in the track. Also, the pickup means includes a brush 7a adapted to make electrical connection with the main power conductor 7 previously referred to.

It is desired that a succession of vehicles MV and vehicles IV be so spaced and travel at such a rate as to permit the merging or intersection of such vehicles without conflict. Accordingly, the control conductors 8, as illustrated in broken lines in FIG. 1, are short conductor sections in each of the tracks M and I, which short conductor sections constitute control positions or stations at which control signals will be picked up by the pickup means 6, whereby to regulate the relative speed and, therefore, the position of the vehicles as they approach the intersection or crossing in the tracks M and I.

Figure 4:
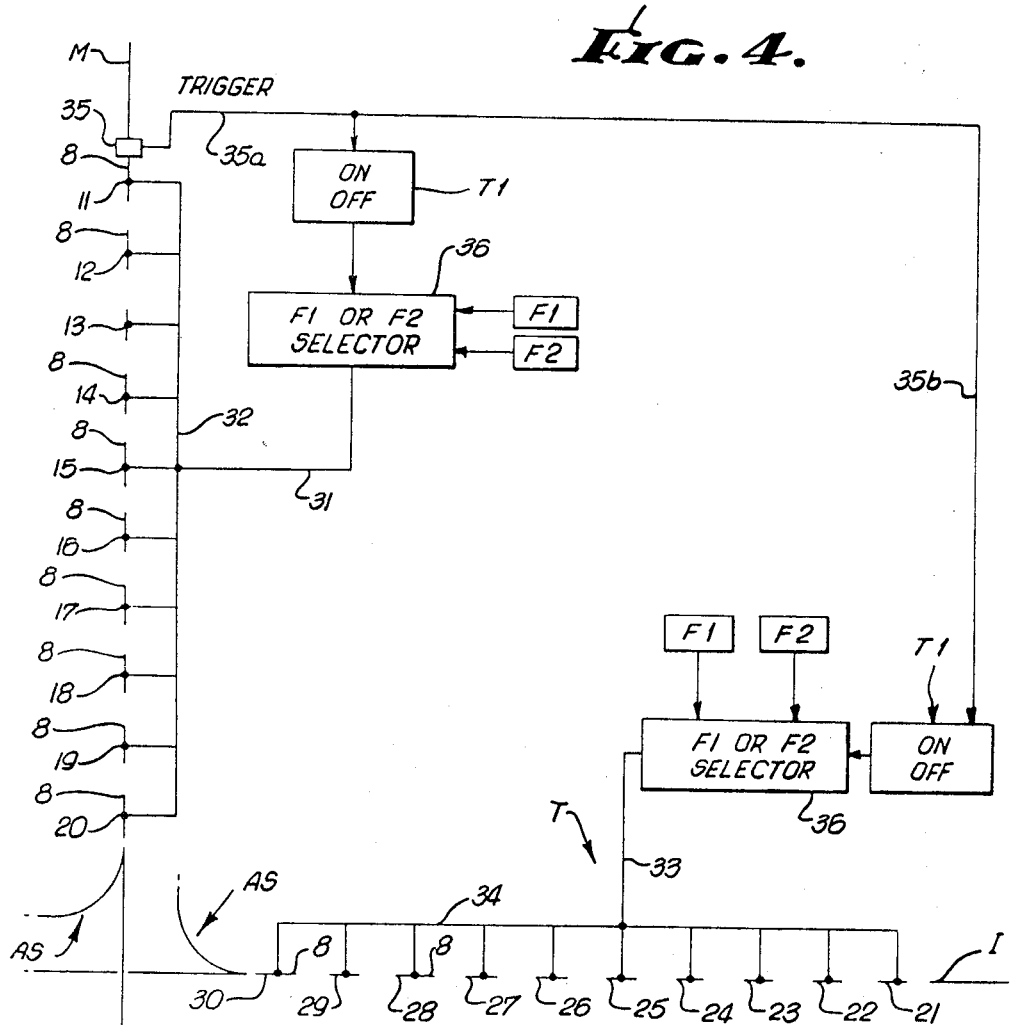
FIG. 4 is a view diagrammatically illustrating the application of the timing means of the invention to control velocity of vehicles with the main and intersecting control systems.

Means for regulating the vehicle travel comprise a timing means or system, on the one hand, and a vehicle speed control means or system, on the other hand. For illustrative purposes, the timing means, generally denoted at T, is shown in FIG. 4 as being associated with the main and intersecting tracks M and I, and as including in each of the tracks the control conductors 8 at a plurality of control stations, ten of which have been shown for illustrative purposes. In addition, as shown in FIG. 2, the speed control means or system may be incorporated in one of the vehicles. An illustrative speed control system S is diagrammatically illustrated in FIG. 5.

More specifically, as seen in FIG. 4, the main vehicle track M has a series of equally spaced stations 11–20, each including a control conductor 8. Correspondingly, in the intersecting track I are a series of stations 21–30, each also including one of the control conductors 8. All of the control stations 11–20 are interconnected together by a conductor 31 and a common conductor 32, while all of the stations 21–30 are interconnected together by a conductor 33 and a common conductor 34.

The conductors 8 at each side of the stations 11–20 and 21–30 are supplied with timed different control signals supplied from suitable means, such as the energizing systems shown schematically in FIG. 4, whereby the respective conductors 8 at the several stations will be, in accordance with the present embodiment of the invention, supplied with electric signals of one type, say, current at a first or relatively low frequency for a period of time, and then with electric signals of a distinct or different type, say, current at a relatively high frequency for a further period of time.

The timing systems just referred to include a trigger 35 disposed in the path of an oncoming vehicle on the track M, or, if preferred, on the track I, whereby the operation of the timing systems will be initiated upon the passage of each vehicle therepast. It is to be noted that the trigger 35 is located a distance from the respective station 11, equalling one-half the distance between the station conductors 8.

Connected with the trigger 35 by a conductor 35a and a conductor 35b, so as to be energized thereby, are timers T1 of any suitable construction adapted to be turned on in response to actuation of the trigger 35 and to turn off following the passage of a vehicle a distance equivalent to the ten stations at the desired, predetermined velocity. The trigger 35 resets the timers to "on" upon the passage of each successive vehicle past the trigger.

A selector 36 in the timing system of both the main and intersecting tracks is energized, which is adapted to cause connection of the above-mentioned conductors 31 and 33 with a first oscillator F1 for a portion of the timed period, and with a second oscillator F2 for another portion of the timed period, and to disconnect the conductors 31 and 33 from both the oscillators during a portion of the timed period. The timer and selector 36 may be mechanized by any conventional cyclical timer, such as, for example, the commercially available Haydon repeat cycle timer, which is described in detail in a Haydon Bulletin A.W.H. MC 200, dated June, 1962, published by the A. W. Haydon Company of Waterbury, Connecticut.

In one embodiment, the first oscillator F1 is adapted to energize the stations with a low frequency current, while the second oscillator F2 is adapted to energize the stations with a relatively high frequency current, whereby to cause, as will hereinafter be described, alternate deceleration and acceleration of the vehicles as they traverse the stations 11–20 of track M or stations 21–30 of track I. As a result, an object moving at the proper velocity will be positioned intermediate the segments 8 during the time when the oscillators are connected to the stations, and will be traversing the conductors 8 during the above-mentioned intermediate portion of the timed cycle of the selectors 36 when the oscillators are disconnected.

This function is graphically illustrated in FIG. 6, wherein it will be seen that during a cycle of time T1, following triggering of the timing system, a vehicle moving too fast will be receiving decelerating signals to decrease its speed during operation of the oscillator F1; a vehicle moving too slowly will be caused to increase its speed during operation of oscillator F2; but during the intermediate portion of the period of the operation of selector 36, at which the conductor 31 or 33 is disconnected from the stations or a third, non-responsive signal is applied, the vehicle should be at its proper position, that is, centrally of the station at which it is located.

Figure 11:
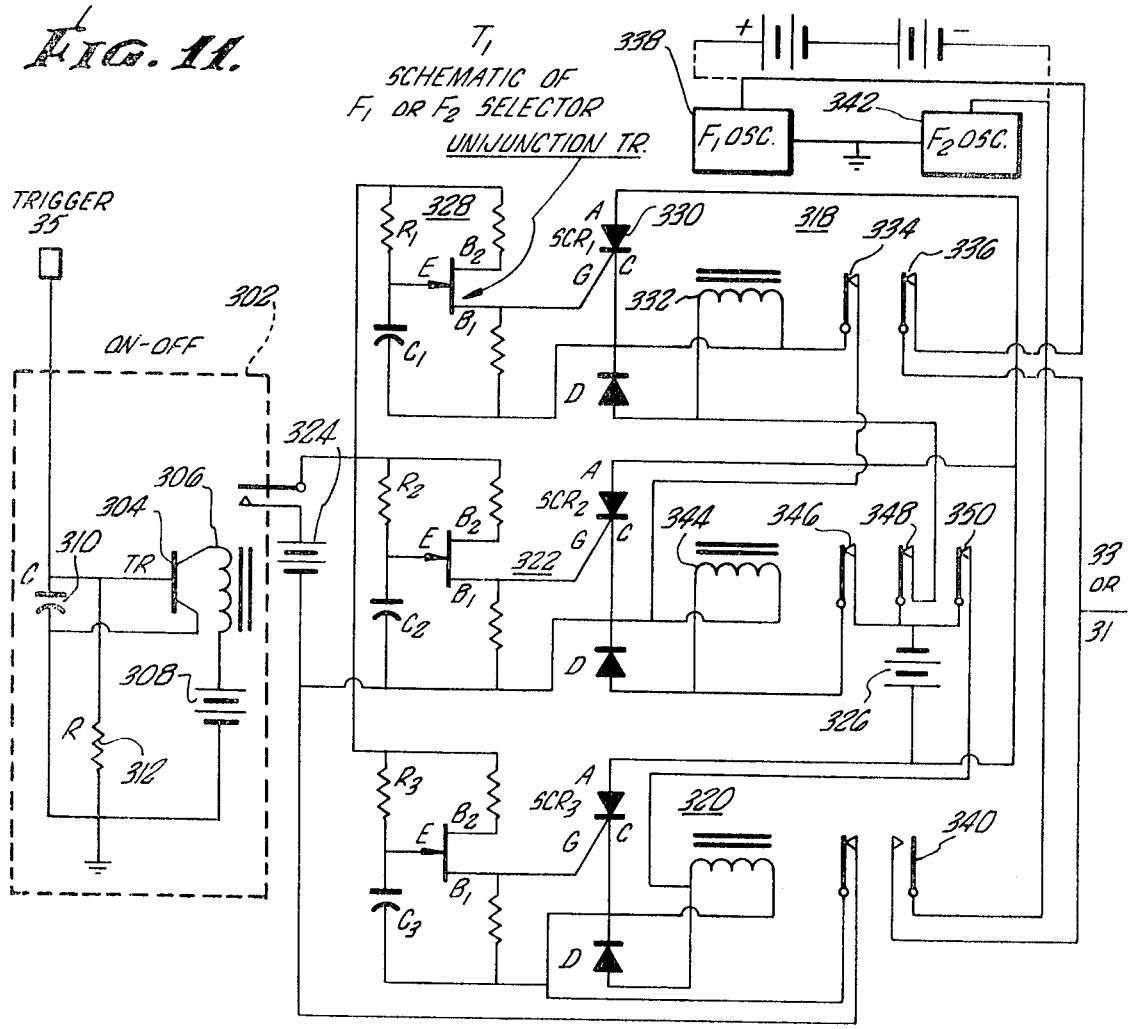
FIG. 11 is a circuit diagram of a timing circuit suitable for use in selecting a first or second control signal.

While the Haydon timer, described above, may suffice as the F1 or F2 selector 36, it is also possible to utilize, for example, a timing circuit of the type described in General Electric Application NOte 90.10, dated 5/65, at page 77, and described in Section 11.7 as a "Precision Solid State Time Delay Circuit," which is illustrated in FIG. 11.7 on that page. Two such devices would be employed, one to apply to F1 signal and the other to apply the F2 signal. A second pair of circuits, substantially identical, could turn off the SCR's to terminate the time during which the F1 or F2 signals are provided.

Still a third circuit might be utilized, such as is illustrated in a paper published by the General Electric Semiconductor Products Department of General Electric Company on Mar. 1, 1966, which illustrates a "12V SEQUENTIAL TURN SIGNAL" circuit. In utilizing that circuit, the illustrated "Thermal Flasher Unit" would be replaced by the trigger switch 35 and, depending upon the sequence desired, the "lamps" of the turn signal circuit could be replaced by relays respectively connecting the source of F1 or F2 signals to the common lead 31, to apply these to the line 8.

While ten stations are illustrated for purposes of correcting or assuring the proper positioning of the vehicles during the "off" portion of the timing cycle, more or less stations may be employed, the object being to progressively reduce any deviation from proper positioning or spacing of vehicles as they successively proceed past the stations toward an intersection or crossing.

Referring again to FIG. 2, the vehicle has been previously described as including the motor 2 which effects drive of the differential 3 and thereby the rear driving wheels 4. As seen in FIG. 3, the electromotive force for driving the motor 2 is derived, in this illustrative embodiment, from the center rail 7 by the brush 7a of the pickup means 6, a conductor 37 being provided in the motor system for connecting the center rail to the motor control means, which may comprise a pulse width modulator 38 adapted to control the speed of the motor, the output of the modulator 38 being regulated by suitable control means 39, which is, in turn, operated by a first servomechanism 40 adapted to cause decreased motor speed through the pulse width modulator 38, and a second servomechanism 41 adapted to cause increased motor speed through the pulse width modulator 38, such variation of electric motor speed by variation of the pulse width of the armature current being well known in the art.

Figure 5:
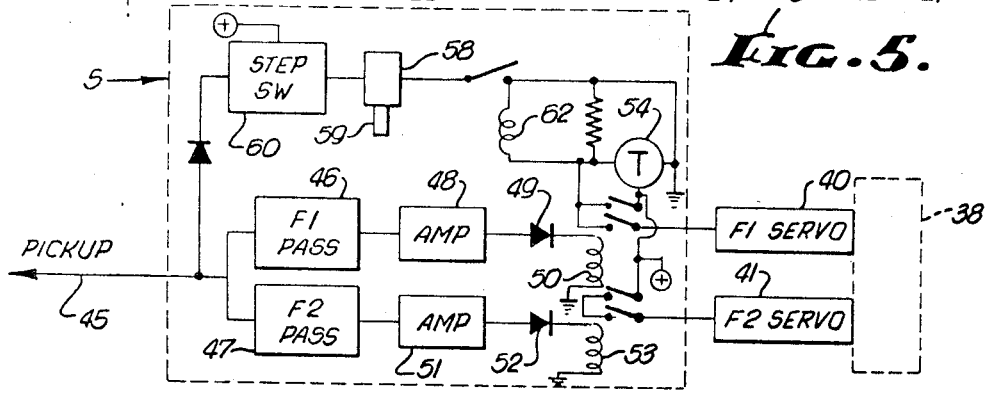
FIG. 5 is a view diagrammatically illustrating the speed control means according to one embodiment of the invention and adapted to be incorporated in a vehicle.

Referring now to FIG. 5, the just-mentioned means 38, which responds to the servos 40 and 41, is illustrated in combination with a speed control system S. This speed control system includes a conductor 45 leading from the pickup brush 8a, which is in contact with the respective control conductors 8 at the stations 11–20 or 21–30 previously described. Included in the speed control system and connected with the pickup conductor 45 is an F1 pass filter 46 and an F2 pass filter 47, respectively adapted to pass the low frequency current supplied by oscillator F1 to the conductors 8 at the respective stations during the low frequency phase of the timing cycles, and the high frequency current supplied by the oscillator F2 during the high frequency phase of the timing cycles. The F1 servo 40 is adapted to be actuated by current passing through the low band pass filter 46 while the F2 servo 41 is adapted to be actuated by the current passing through the high band pass filter 47. Low frequency current passing through filter 46 is amplified, in the illustrative system, by an amplifier 48 and rectified by a rectifier 49 to supply direct current to a relay 50, whereby the circuit to the F1 servo 40 is completed. Likewise, high frequency current passing through the F2 pass filter 47 is amplified by an amplifier 51 and rectified by a rectifier 52 to supply direct current to a relay 53, this relay 53 completing the circuit to the F2 servo control 41. A timer 54 of desired construction is, in the illustrative system, provided to control the period during which the relays will remain closed, the timer being of conventional type adapted to be adjusted to vary the period as may be required in use of the vehicle control system.

As previously indicated, each of the tracks includes an abort switch AS. In the event a vehicle is not at the desired relative position as it approaches either the last station 20 on the main track or the last station 30 on the intersecting track, as evidenced by the fact that it is still reacting to speed corrections, then such vehicle will be aborted or moved out of the traffic stream by closure of the abort switch AS. A typical abort switch is shown in FIG. 2 as being normally open, being biased to the open position by a leaf spring 55 about a pivot 56 for the switch arm 57. Included on the vehicle is a solenoid 58 having an armature 59 adapted, when projected, to engage the switch arm 57 and move the same to a closed position, causing movement of the vehicle from the path in which it was previously travelling onto the side track. In FIG. 5, such a solenoid is shown as being under the control of a position switch 60. It will be understood that the switch 60 may be a stepping switch such as would count the stations as the vehicle passes the same and cause closure of the switch at the tenth station, to energize a relay 62 in circuit with the relays 50 and 53 referred to above, the circuit to the solenoid 58 being completed only if one of the relays 50, 53 is closed, and, therefore, one of the speed adjusting servos 40 or 41 is operating to cause variation of the vehicle speed. The stepping switch 60, moreover, may be of a conventional ratchet and solenoid operated type, the actuator solenoid being energized each time a current is imposed on the pickup conductor 45 to cause the step-by-step progression of the stepping switch. As previously indicated, however, the timing means T1 has an intermediate off mode, during which the pickup 45 will be deenergized if the vehicle is in the correct position along any of the stations 11–20 or 21–30. Thus, the stepping switch may be adapted to function to prevent the circuit to the abort switch operating solenoid 58 from being closed, for example, if the stepping switch 60 has been energized seven times during the progress of a vehicle past the ten stations, even though at the tenth station, the vehicle is receiving speed corrective signals from the tenth station. In use of the system, it may be determined that the exemplary seven energizations of the stepping switch, or some other number, will indicate that the average position of the vehicle is satisfactory to allow it to pass the abort switch, particularly in the event that certain safety fixtures, hereinafter to be described, are employed.

It will now be understood that with the vehicle MV on the main track M moving in a predetermined spaced relation, or alternatively being sidetracked as they reach the intersection with the vehicles on the intersecting track I, the vehicles IV on the latter may safely cross or merge with the main track vehicles, if the merging or crossing vehicles are likewise spaced and are staggered with respect to the main track vehicles by, say, one-half of the main track vehicle spacing.

Figure 7:
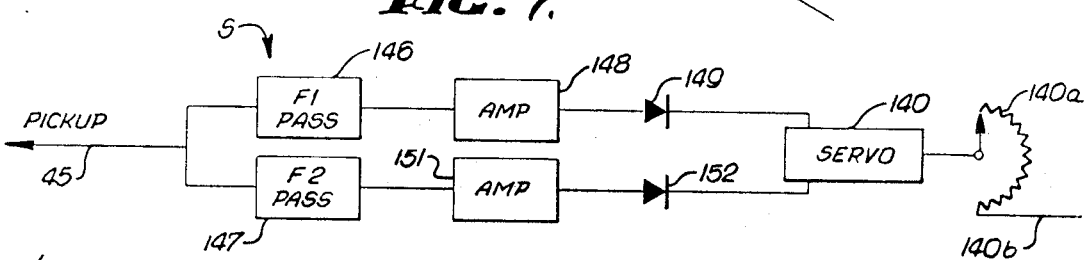
FIG. 7 is a view diagrammatically illustrating a modified speed control means embodying the invention and adapted to be incorporated in a vehicle.

Another illustrative means for controlling the vehicle speed in response to high and low frequency signals derived from the time controlled oscillators is illustrated in FIG. 7. In this control system, the pickup conductor is designated 45 and is adapted to receive current through brush 8a from control conductors in one of the rails during the timed operation of the time control system, as previously described. The pickup conductor 45 leads to an F1 or low band pass filter 146 and to an F2 or high band pass filter 147. The low band pass filter 146 is connected to an amplifier 148, and the latter is connected through a rectifier 149 to a servo control mechanism 140, to decrease the speed of the vehicle motor 2. Likewise, the high band pass filter 147 is connected by an amplifier 151 and a rectifier 152 to the servo-mechanism 140, to increase the speed of the vehicle motor 2.

Referring again to FIG. 2, a control system, such as that shown in FIG. 7, is illustrated as being incorporated in the vehicle as a redundant system in combination with the control system of FIG. 5. Thus, the pickup conductor 45 leads to the control system S of FIG. 7, and the output signal from the control system is supplied to the servo 140 to effect operation of a rheostat 140a connected by a lead 140b to vary the field voltage of the motor 2, and thereby vary the motor speed. In the operation of such a system as a redundant system, in addition to that previously described, it will now be appreciated that the speed control system of FIG. 7 may derive its control signals from the control conductors 9 at the same station locations as the control conductors 8. Alternatively, in the absence of a redundant system, the speed control system of FIG. 7 may be employed in lieu of that of FIG. 5.

Figure 8:
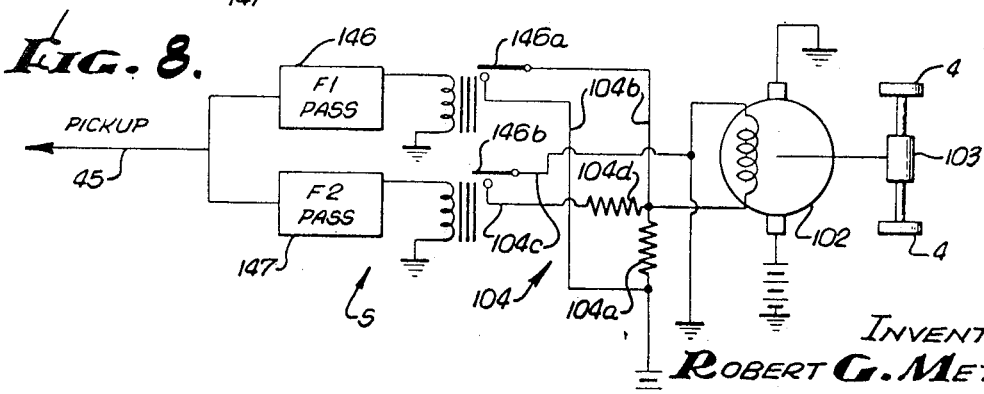
FIG. 8 is a view diagrammatically illustrating still another modified speed control means adapted to be incorporated in a vehicle to produce pulsed speed changes in accordance with the invention.

Still another speed control system is illustrated in FIG. 8, which may be used singularly or redundantly with either of the systems shown in FIGS. 5 and 7, to cause pulse speed corrections as distinguished from the speed adjustments accomplished by the servo controls of FIGS. 5 and 7. In FIG. 8, the pickup conductor is again designated 45, and it is connected with the respective F1 pass filter 146 and F2 pass filter 147. The motor, designated 102 in FIG. 8 and connected to the rear wheels by the differential 103, is supplied with a normal field voltage through a circuit designated 104 including resistance 104a. The field voltage supplied to the motor 102 will be varied by the closure of either a delayed opening relay 146a connected with the F1 pass filter or a delayed opening relay 146b connected to the F2 pass filter, depending upon which of the filters is passing the current from pickup 45 under the control of the timing system of the vehicle track, so that the field voltage will be correspondingly varied and the motor speed altered. Closure of the relay 146a will cause the motor field to be energized through a circuit 104b bypassing resistance 104a at a higher voltage; while closure of relay 146b will complete a circuit 104c including a further resistance 104d to cause the motor field to be energized with a lower voltage, to vary the speed of motor 102 and thus the speed of the vehicle.

It is to be noted that the speed changes effected by the speed control means of FIG. 8 are pulsed changes due to the fact that the motor field is energized by a normal voltage, and then, only during the period of delay in the reopening of relays 146a and 146b, with more or less voltage. On the other hand, the servo operated speed changing systems of FIGS. 5 and 7 effect a change of speed which remains fixed until the servo means is activated in the opposite mode. Thus, a system such as that of FIG. 8 may be combined with a system such as that shown in either FIG. 5 or FIG. 7 in a redundant system, which will combine a variable fixed speed change and a pulsed-type speed change, as, for example, if the normal field voltage supplied by circuit 104 to the vehicle motor 102 of FIG. 8 were controlled by rheostat 140a of FIG. 7.

Referring now to FIG. 9, there is illustrated a redundant timing system with which the speed control systems previously described are cooperative to control the intersecting flow of traffic on the main track or path M and the intersecting track or path I. In this redundant control system, there is included along the main track M a plurality of stations respectively designated 211–220, and at each of these stations is a control conductor 208. These control conductors are, as in the case of the system shown in FIG. 4, all connected in a common conductor 232 to a conductor 231 leading from a P1 or P2 selector 236, this selector being under the control of the on-off timer mechanism T1, which is, in turn, adapted to be turned on each time a vehicle on the main line passes a trigger 235 and to remain on through ten cycles, as well as to be restarted each time a successive vehicle passes the trigger 235. Likewise, there is, at each of the plurality of stations 221–230 spaced along the intersecting track or path I, a similar control conductor 208, these conductors being adapted to be energized through a P1 or P2 selector 236 when the on-off timer T1 is energized by the trigger 235 in the main path M responsive to the passage of a vehicle MV. Sources of P1, or negative pulses, and P2, or positive pulses, serve the same function as the F1 or F2 sources of the embodiments described above.

Thus, a vehicle will be intermittently caused to accelerate upon receipt of P2 pulses and decelerate on receipt of P1 pulses on either of the paths M and I as it approaches the intersection or point of mergence, if the vehicle is equipped with or is responsive to a speed control system such as that shown in FIG. 10, below. It will be understood that the abort switches AS may be actuated by a system such as that previously described in respect of the speed control system of FIG. 5.

In addition, however, the timing means of FIG. 10 also includes a timing control generally, such as that described above. The intersecting path I in the embodiment of FIG. 9 includes control conductors 209 spaced along the intersecting track at each of the stations 221–230, and each of the conductors 209 is connected by a common conductor 234 to the conductor 233, which is, in turn, connected to a P1 or P2 selector 236, the latter being under the control of an "on-off" timer T2. This timer is also adapted to be energized each time a vehicle passes selected ones of the stations 211–220 on the main track or path M. Accordingly, at stations 215–220 is a trigger, these triggers being designated 235a through 235f. Thus, a vehicle passing along the main track M of FIG. 10 will successively actuate the triggers 235a through 235f, causing, in each instance, the starting of the timer T2 and the resultant timed energization of the station conductors 209 at each of the intersecting track stations 221–230 with speed corrective signals, so that an intersecting vehicle will be properly spaced with respect to the main vehicle as they approach the intersection. Since it may be assumed that a vehicle has been corrected to the proper speed at station 214, only subsequent stations are provided with triggers 235a through 235f.

It will now be appreciated upon further reference to the vehicle generally illustrated in FIG. 2 that the vehicle may constitute either a main vehicle or an intersecting vehicle travelling on either the main track or the intersecting track, and that the pickup means 6 of the vehicle will respond to the signals derived from each of the conductors 208 and 209 of the time control system of FIG. 10, so as to cause the simultaneous operation of the redundant speed controlling systems of the vehicle of FIG. 2.

As a safety precaution, in order to assure sidetracking of improperly spaced vehicles, the system of FIG. 9 also includes a discriminator 240 which is connected to a sensing element 241 located adjacent station 220, being energized as a vehicle on the main track M passes the last station 220. If, at the same time that the sensing element 241 detects a vehicle on the main track M, a second sensing element 242 at the last station 230 of the intersecting track I detects the presence of a vehicle on the intersecting track, so as to impose a signal on the discriminator 240 indicative of the presence of an intersecting vehicle on a collision course, then the abort switch on one of the tracks may be closed and cause one of the vehicles to be side-tracked.

By way of illustration, the discriminator 240 is shown as being connected by a conductor 243 to a solenoid actuator 244 adapted to effect the automatic closing of the abort switch AS in the intersecting track if vehicles are detected at each of the discriminator sensors 241 and 242 at the same time. The sensing elements and discriminator means may be simple switches, for example, both of which are in series with the solenoid conductor 243, and hence must be closed at the same time to actuate the solenoid.

As a still further precaution, the main and intersecting tracks M and I may be provided with an emergency shut-off means adapted to effect halting of the drive to the vehicles in the event that a vehicle on the main track M and a vehicle on the intersecting track I have passed through the open abort switches and are nevertheless on a collision course. In this connection, a discriminator 245 connected by a sensor 246 to the main track and by a sensor 247 to the intersecting track, as seen in FIG. 11, is adapted to effect operation of a relay 248 which will shut off the power to the vehicle drive system, such as, for example, by shutting off the power to the center rail 7 by which the exemplary vehicle of FIG. 2 is driven.

Referring to FIG. 10, a modified speed control system is shown for use in controlling the speed of a vehicle travelling on a track, either main or intersecting, which track has a plurality of stations at which station conductors are energized by positive P2 and negative P1 pulses, in lieu of signals or pulses of different frequency, so as to provide different or distinct signals for controlling or changing the speed of a vehicle. In this figure, the vehicle drive motor 202 drives the differential 203, as in FIG. 8. A brush 7a (FIG. 3) and conductor 37 is adapted to energize the motor 202 with current derived, for example, from a power rail 7, as previously described. The field coil 202a of the motor 202 is grounded through a variable resistance 240a which is adjusted by a permanent magnet field, reversible motor 240, which, for example, may drive the shiftable resistance contact through a worm and gear drive 240b. This motor 240 is adapted to be energized by positive P2 and negative P1 signals picked up by a brush 8a of FIG. 3 through conductor 45 at the stations along either a track M or a track I, the circuit being completed by the ground contact 12 and brush 14 (FIG. 2), previously described. It will now be understood that the timing means, such as timing means T1 of the previously described embodiments, will be adapted to produce at the several track stations, as at the station conductors 9, first a negative pulse P1, then an off period, and then a positive pulse P2 to effect reversals of the motor 240 and consequent variation of the field voltage of vehicle drive motor 202.

The control system of FIG. 10 also embodies an abort switch operating means including an abort switch operating solenoid 258 and its armature 259, which are under the control of a position counter or stepping switch, to cause, as in the case of the stepping switch 60 previously described, sidetracking of a vehicle if it is receiving speed corrective pulse at the last station, or has previously received speed corrective pulses at more of the stations than the stepping switch has been set for purposes of aborting the vehicle travel. Thus, the circuit for abort solenoid 258 includes a relay 262 which is normally open, but which is closable under the control of the stepping switch 260, the relay being energized via a conductor 262a leading from conductor 8a, the other side of the relay 262 being grounded through the stepping switch 260 via a conductor 262b along with the stepping switch ground conductor 260b.

The stepping switch 260 is energized via a lead 260a by signals picked up by the conductor 8a, so that when the conductor 8a receives a signal at any station along the track, the stepping switch will be actuated. The stepping switch may be undirectionally operated by the D.C. negative and positive signals picked up at the stations, or, if desired, the sensing means may also pick up an A.C. signal which may be rectified by a rectifier in conductor 260a (not shown). In either case, the relay 262 will be caused to close, causing energization of abort solenoid 258 in the event a signal is picked up at the last station in the series of stations, unless the stepping switch has been set to ignore the signals if it has picked up a predetermined number of signals during the passage of the vehicle past the several stations indicating that the average position of the vehicle is satisfactory to avoid collision at the intersection.

Turning now to FIG. 11, there is shown a circuit suitable for timing and selecting an F1 signal or an F2 signal to the station conductors 8. Such a circuit may be utilized as timer T1 and the F1 or F2 Selector 36, or may be a TImer-Selector 436.

These circuits include an "on-off" switch portion 302 which is energized by a signal from the trigger circuit 35, and includes a trigger transistor 304. The transistor 304 collector is coupled to a relay solenoid 306 and to a power supply 308 which connects to the emitter of the transistor 304. A trigger capacitor 310 is connected between the base of the transistor 304 and the emitter. A base bias resistor 312 is connected to a common reference source 314.

When the trigger 35 is energized, a signal is applied to the base of the trigger transistor 304 which causes a current to flow through the relay solenoid 306, closing a contact pair 360. At the same time, the capacitor 310 is charged, which discharges through the base resistor 312. Depending upon the time constant of the RC circuit, the relay solenoid 306 will remain energized until the potential at the base of transistor 304 is insufficient to maintain conduction in the transistor 304. Normally, the time constant is such to hold the relay operable for an interval greater than that required for a vehicle to pass all of the control stations.

The remainder of the selector circuit includes three sub-circuits, an F1 select sub-circuit 318, an F2 select circuit 320, and a master cycling circuit 322. Basically, the three circuits are substantially identical with the differences residing in the magnitudes of the components which determine the time that each of the sub-circuits operate. Each sub-circuit includes a relay and the relay contacts are so arranged that either F1 or F2, or neither, is connected to the output line.

The sub-circuit of the F1 selector 318 will be described, with the understanding that remaining sub-circuits are substantially similar. A common supply 324 powers the triggering circuit of the master cycling circuit 322 directly, and powers the other triggering circuits through relay controlled switches. A second, shared power supply 326 drives the relay circuits through the normally closed switches of the master cycling circuit 322.

When the relay contacts 316 are closed by operation of the "on-off" circuit 302, a Unijunction Transistor Relaxation Oscillator Trigger Circuit 328, such as is illustrated in the "Silicon Controlled Rectifier Manual," published in 1961, by the General Electric Company, Second Edition, at page 46, energizes a first Silicon Controlled Rectifier or SCR (SCR$_1$) 330, through which power from the second power supply 226 can be applied to a relay solenoid 332. The solenoid 332 controls a pair of normally closed switches 334, 336, one of which controls the power to the trigger circuit 328 and the other of which connects a first, F1 oscillator 338 to the output line.

After a first timed interval, the trigger circuit 328 fires to render the first SCR (SCR$_1$) 330 conductive, which energizes the relay solenoid 332, opening the switch contacts controlled by it. The direct result of this action is the disconnecting of the trigger circuit 328 from the power supply 324 and the disconnecting of the F1 oscillator 338 from the output line.

Similarly, the F2 sub-circuit 320 is energized after a second timed interval that is equal to the desired "on" time of the F1 signal, plus the interval during which no signal is to be provided. At the end of that second timed interval, the F2 select sub-circuit 320 is energized, closing a switch contact 340, which connects an F2 oscillator 342 to the output line and disconnects the trigger circuit from the power supply 324.

After a third timed interval, which is calculated to equal the sum of the first and second timed intervals of the F1 and F2 select sub-circuits 318, 320, the master cycling circuit 322 trigger circuit renders its SCR (SCR$_3$) conductive and energizes a third relay solenoid 344, which opens three, normally closed switch contacts 346, 348, 350 to interrupt all three SCR circuits, thereby rendering them non-conductive and disabling all of the relays. The normally closed switches 334, 336 of the F1 select circuit 318 return to their initial condition which applies power to the trigger circuit 328 and connects the F1 oscillator 338 to the output line.

In many automatically controlled systems, it is frequently desirable to have a merging system, whereby an object would be automatically accelerated or decelerated at a controlled rate so that an object will be travelling at predetermined rates of speed at specific locations along its path of travel. A specific example could be a rapidly moving passenger vehicle which must be transferred to a shunt path and decelerated to admit or discharge passengers and accelerated to rejoin the main vehicle path. Similarly, an object might have to be accelerated or decelerated to a predetermined speed in order to transfer to a different path.

Figure 12:
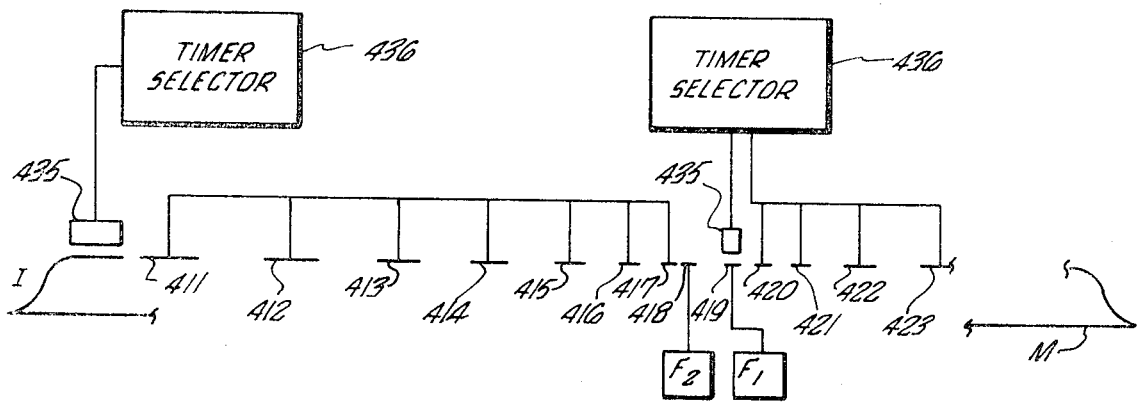
FIG. 12 is a view illustrating an object transportation system, including a main line of objects, and a branch line for withdrawing objects from the main line and introducing objects into the main line.

In FIG. 12, objects on the main track or path M are appropriately spaced by the systems described above. A shunt path I is shown which can automatically decelerate objects to a stop, and then automatically accelerate them to a speed compatible with travel on the main track M.

Objects switching from the main track M trip a trigger 435, initiating a timed cycle of the Timer-Selector 436. Assuming that the object is travelling at a faster than desired velocity, it will pass station 411 "early" in the cycle and will be subjected to F1 or decelerating signal. If, in a subsequent station, the object is moving too "slowly," then it will receive F2 or accelerating signals to increase the speed to the appropriate velocity for that station.

The object will continue to decelerate until a final station 417 is reached, at which time the object may either be travelling at a very slow, desired velocity, or may arrive at a subsequent station 418 which continuously provides an F1 decelerating or braking signal.

The object is preferably stopped at the next conductor 8 which can be used to accelerate the object to a desired, terminal velocity. An initial station 419 provides a continuous accelerating signal F1 and a series of stations are then encountered. If the object is travelling too slowly, an accelerating F2 signal will be received. If the object is accelerated sufficiently to the desired velocity, then it will pass each subsequent station at a desired velocity and at a time during the control cycle when no signal is provided. If, however, the object is travelling at a greater than desired velocity at any station, it will be subjected to decelerating F1 signals.

It will be understood that a merging control system, similar to the system of FIG. 4, would be used to control the spacing of objects on the main path M and the intercepting path I. Further, a velocity-spacing controlling block could precede and follow each branch or merge point so that objects could be properly spaced for the desired velocity.

It will now be apparent that the present invention has provided, in accordance with the objectives recited at the commencement hereof, a vehicle control system for use in transporting vehicles along paths which are intersecting in the sense of crossing or merging without need for personal attention by a vehicle operator, the combined time and speed control systems functioning to assure that the vehicles will be proper spaced relationship at the intersection or point of mergence. While the vehicle speed control means have been variously illustrated as associated with the vehicle itself, it will be understood that such speed control means may be included in the respective stations and the controlling functions transmitted to the vehicle power source by the pickup means.

I claim:

1. In a transportation system including means defining a main object path, and means for continuously moving objects in said path: control means for subsequently controlling the spacing between objects over a predetermined limited portion of the path, said control means including means coupled to the objects and responsive to the presence of an object at a first location for initiating a control cycle for selectively increasing or decreasing the velocities of randomly spaced objects in the path during a preset interval of time while the objects are moving in the path to achieve and maintain a predetermined spacing of the moving objects in the path with respect to one another.

2. A transportation system as defined in claim 12, above, further including timing means coupled to said control means and adapted to be operated by passage of objects in the path, whereby the velocity and relative spacing of an object is directly controlled by the same object for a predetermined period of time.

3. In a transportation system including means defining a main object path, and objects continuously movable along the path: control means for adjusting the velocities of the objects in the path to achieve a desired velocity at a predetermined location, said control means including means coupled to the objects and responsive to the presence of an object at a first location for initiating a control cycle during which the velocity of said object is modified over a portion of the object path during a preset interval of time to achieve the desired velocity of said object at the second predetermined location.

4. The transportation system of claim 3, further including means coupled to said control means for maintaining said object at the desired velocity over a designated portion of the object path.

5. The transportation system of claim 3, wherein the desired velocity is greater than the object velocity at the first location.

6. The transportation system of claim 3, wherein the desired velocity is lesser than the object velocity at the first location.

7. The transportation system of claim 3, including a plurality of signal providing means including signal providing elements adapted to apply accelerating and decelerating signals to the objects, said signal providing elements being arranged to apply decelerating signals to objects in operative relationship at times earlier than desired, accelerating signals to objects in operative relationship at times later than desired and no signals to objects in operative relationship at the desired time.

8. The transportation system of claim 7, wherein said signal providing elements are of variable lengths, spaced apart by variable distances, whereby objects travelling at desired velocities are between adjacent elements during the provision of accelerating and decelerating signals and are in operative relationship with said elements when no signals are being provided.

* * * * *